US011156004B2

(12) United States Patent
Oldorff et al.

(10) Patent No.: US 11,156,004 B2
(45) Date of Patent: Oct. 26, 2021

(54) METHOD FOR FINISHING A SUPPLIED BUILDING PANEL

(71) Applicant: Flooring Technologies Ltd., Kalkara (MT)

(72) Inventors: Frank Oldorff, Schwerin (DE); Ingo Lehnhoff, Dierhagen (DE); Norbert Kalwa, Horn-Bad Meinberg (DE); Rüdiger Klupsch, Heiligengrabe (DE); Thomas Lehmann, Heiligengrabe (DE)

(73) Assignee: FLOORING TECHNOLOGIES LTD, Kalkara (MT)

( * ) Notice: Subject to any disclaimer, the term of this patent is extended or adjusted under 35 U.S.C. 154(b) by 0 days.

(21) Appl. No.: 16/972,430

(22) PCT Filed: Apr. 2, 2019

(86) PCT No.: PCT/EP2019/058287
§ 371 (c)(1),
(2) Date: Dec. 4, 2020

(87) PCT Pub. No.: WO2019/233652
PCT Pub. Date: Dec. 12, 2019

(65) Prior Publication Data

US 2021/0230880 A1 Jul. 29, 2021

(30) Foreign Application Priority Data

Jun. 8, 2018 (EP) .................................... 18176816

(51) Int. Cl.
*B32B 3/10* (2006.01)
*E04F 15/02* (2006.01)
(Continued)

(52) U.S. Cl.
CPC .......... *E04F 15/02033* (2013.01); *B44C 1/24* (2013.01); *B44C 5/043* (2013.01); *E04F 15/102* (2013.01)

(58) Field of Classification Search
None
See application file for complete search history.

(56) References Cited

U.S. PATENT DOCUMENTS

| | | | | |
|---|---|---|---|---|
| 4,579,767 | A | 4/1986 | Coggan et al. | |
| 2005/0089644 | A1 * | 4/2005 | Oldorff .................... | B05D 7/06 427/393 |

(Continued)

FOREIGN PATENT DOCUMENTS

| | | |
|---|---|---|
| DE | 102014010747 | 1/2016 |
| EP | 1820640 | 8/2007 |

(Continued)

OTHER PUBLICATIONS

International Search Report in related International Application No. PCT/EP2019/058287 dated Jun. 3, 2019, 6 pages.

(Continued)

*Primary Examiner* — Christopher M Polley
(74) *Attorney, Agent, or Firm* — Andrew M. Calderon; Roberts Calderon Safran & Cole, P.C.

(57) ABSTRACT

The disclosure relates to a method for finishing a supplied building panel made of a wood material, in particular MDF or HDF, with an upper side and a lower side, wherein, in a first embossing step, a relief is embossed at least into the upper side as first strip-shaped depressions with two opposing side walls, a bottom wall connecting said side walls and a depth (T), and subsequently a decorative pattern (3) is printed on the embossed upper side of the building panel, and the decorative pattern is then sealed by applying an abrasion-resistant layer (4). According to the invention, additional depressions extending at an angle (α) transversely (Continued)

Figure 1:
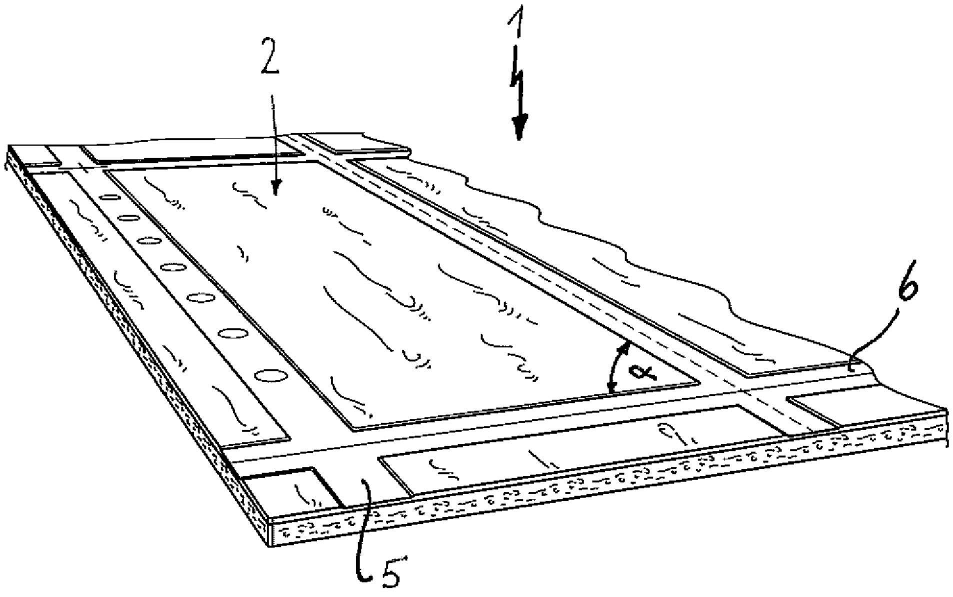

to the first depressions are embossed, and the large-format supplied building panel is divided into individual panels by carrying out a saw cut in and along each of the depressions.

17 Claims, 7 Drawing Sheets

(51) Int. Cl.

| | |
|---|---|
| ***E04F 15/10*** | (2006.01) |
| ***B44C 5/04*** | (2006.01) |
| ***B44C 1/24*** | (2006.01) |

(56) References Cited

U.S. PATENT DOCUMENTS

| | | | | |
|---|---|---|---|---|
| 2007/0193174 | A1 | 8/2007 | Vogel et al. | |
| 2015/0283849 | A1* | 10/2015 | Oldorff | B05D 7/08 428/203 |
| 2018/0133922 | A1 | 5/2018 | Herrmann et al. | |
| 2019/0085569 | A1 | 3/2019 | Ryberg | |

FOREIGN PATENT DOCUMENTS

| | | |
|---|---|---|
| EP | 3059020 | 8/2016 |
| WO | 2016180643 | 11/2016 |
| WO | 2017164806 | 9/2017 |

OTHER PUBLICATIONS

Written Opinion in related International Application No. PCT/EP2019/058287 dated Dec. 12, 2019, 7 pages.

* cited by examiner

METHOD FOR FINISHING A SUPPLIED BUILDING PANEL

FIELD OF INVENTION

The invention relates to a method for finishing a supplied building panel, in particular MDF or HDF, with an upper side and a lower, wherein, in a first embossing step, a relief is embossed at least into the upper side as first strip-shaped depressions with two opposing side walls, a bottom wall connecting said side walls and a depth, and subsequently a decorative pattern is printed on the embossed upper side of the building panel, and the decorative pattern is then sealed by applying an abrasion-resistant layer.

BACKGROUND

This type of method is described, for example, in WO 2017/164806 298 A1. With this method, a floor panel is finished by pressing a bevel into the side edges starting from the top.

Once finished, the building panels known from EP 1 820 640 B1 are divided into individual panels and used, for instance, as floor or wall and ceiling panels; they are often given a wooden, stone or fantasy decorative pattern with a superimposed, three-dimensional surface. The divided panels features joining elements (tongue and groove) and are generally equipped with locking elements for locking adjacent panels in the horizontal and vertical direction (so-called click panels). The superimposition of a decorative pattern and three-dimensional surface results in a realistic impression of the imitated material, both in terms of looks and feel.

In the case of floor panels in particular, it is common for them to feature a coating on at least the upper side and a structure adapted to the decorative pattern. This type of structure is known as an embossed-in-register structure. Here, the decorative pattern is either a paper layer laminated onto the carrier plate or coating printed directly onto the carrier plate. The decorative pattern is also equipped with an anti-wear layer. To this end, either abrasion-resistant paper layers, so-called overlays, or, after curing, abrasion-resistant lacquer or resin layers are used. The EIR structure is in the form of a three-dimensional surface structure and is embossed in the panel surface by means of a corresponding three-dimensionally structured press plate. During this process, the components of the coating that are activated by heat and pressure melt and run, thereby filling out the three-dimensional structural embossing while curing. The structure generally has a height of up to 500 μm. The number and depth of the structures are limited by the available quantity of activated components on the one hand, and by the press force on the other.

In the case of laminate flooring, the joint edges where adjacent floor panels meet are problematic. Depending on the light falling on it, even the smallest differences in height cause visually unattractive shadows that negatively affect the overall appearance of a floor. The wood material core also renders the panels sensitive to moisture. Any liquids spilled on the floor must be wiped away as quickly as possible to prevent the liquid from penetrating into the connecting joints between the joint edges. Should any water penetrate, the wooden fibers in the carrier panel may expand and cause irreversible swelling, as the swelling pressure in the wood destroys the joint and/or the adhesive becomes partially hydrolysed. It is therefore important that what will later become the joint edges are given special attention during the production of the panels. Adjacent panels should be able to lie firmly against each other, there should be a visually uniform appearance to a floor of laid panels and precautions must be taken to ensure that spilled liquid cannot immediately flow into the connecting joints.

EP 3 059 020 A1 discloses a method for producing a wood material panel with a decorative layer, which provides for the treatment of at least one section of its surface with steam that contains water, the grinding of the moistened surface and subsequently the provision of at least one decorative layer.

U.S. Pat. No. 4,579,767 A describes a hardboard in which a tiled section simulated by longitudinal and transverse depressions is embossed and which is coated to imitate tiles. Each hardboard features a plurality of individual tiles. Several hardboards can be laid next to one another.

WO 2016/180643 describes the production of panels with depressions in the edge regions of the usable surface, achieved by embossing at least two grooves running parallel to each other into a large-size wood material panel with a web forming between them and dividing the embossed panel into individual smaller panels with a saw cut through the web.

SUMMARY

On the basis of this problem, the method described in the introduction should be be improved accordingly.

In order to avoid the aforementioned disadvantages and to be able to lower the side edges of the panels all the way around, according to the invention, a method according to the preamble provides that at least one further depression running at an angle transverse to the at least one depression is embossed. The large-size building panel is divided into individual panels by making a saw cut in and along the depressions.

As a result of the embossed depressions, the upper side is lowered at the side edges. The joint edges of adjoining panels are therefore lower than on the upper side. In such a case, height offset cannot cause shadows that are visually noticeable because all butt joints are lowered. A firm joint between adjacent panels can be achieved by means of appropriate edge profiling, which effectively prevents liquid from penetrating too quickly into the butt joint.

If an MDF or HDF panel is used as a building panel, it is intended that its bulk density profile (progression of the density across the cross-section of the panel) is lowered compared to a conventional bulk density profile, as known from EP 3 023 261 B1, for example. When the fiber cake is pressed to form a building panel of the desired thickness, the greatest bulk density occurs in the region of the upper and lower side of the panel. As a result of the heat input during pressing, a press skin forms on the upper and lower side, which is also called the "rotting layer". If the panel has been pressed with a maximum bulk density in the top layers of 950-1000 kg/m$^3$, it can be provided press-finished, i.e. the press skin is not removed. However, it is also possible to at least partially sand down the press skin to reduce the density on the top side.

Before or after embossing, a tempering agent, preferably an aqueous melamine resin, can be applied to the top surface. The tempering agent ensures that the previously reduced bulk density on the upper side (in the top layer) is increased again to achieve sufficient strength properties on subsequent panels.

To facilitate embossing, the building panel is heated to 40 to 80° C., preferably 60° C., and during the embossing of the at least one depression, a surface temperature of up to 220° C. is achieved. The building panel can be heated using steam.

To create an easily printable surface, the upper side of the building panel can be primed with a white paint before embossing the depression. At least the depression can be printed with a single-color or multicolor decorative pattern using a digital printer. If necessary, another color can be used instead of white for priming.

The first embossing step can be carried out using at least one calender roll. This has the advantage that the embossing step can be integrated into the production line. Embossing can then follow on directly from the pressing of the wood material panel in a continuous press, in which the previously scattered fiber cake has been pressed to form a panel of the desired thickness, or it can be arranged upstream of the printing of the top side in a printing plant. This optimizes production.

Once the structure is completed, consisting at least of a primer, the decorative pattern and an abrasion-resistant layer, the building panel is laminated in a short-cycle press under high pressure and at a high temperature. In a second embossing step, it is embossed once again in the at least one strip-shaped depression to achieve the formation of the side walls without changing the position of the bottom wall in terms of depth. During coating, the side walls formed in the first embossing step are "rounded", so that the second embossing step transforms these rounded sections back into a flat surface.

If the tempering agent was applied before the first embossing step and a sufficiently high temperature is achieved in the first embossing step, the melamine resin cures already during the first embossing step and increases the bulk density. If the tempering agent is not applied until after the first embossing step, it cures in the short-cycle press. The same applies if a sufficiently high temperature is not achieved in the first embossing step.

The depth of the at least one depression is preferably up to 0.7 mm and can in particular be graded so that the bottom wall is in the form of steps. In such a case, several first pressing steps with different press depths are carried out.

In order to be able to align the building panel during the subsequent further processing steps, markings can be printed on the bottom walls of the at least one depression, which may be in the form of lines, circles, dots, crosses or other graphic symbols. Preferably, lines are used. These markings can be used by a camera system to align the building panel for the second embossing step and further subsequent processing steps.

Re-embossing in the depression in the second embossing step is preferably conducted in a short-cycle press, in which strip-shaped elevations are applied to the press plate.

In the first and/or second embossing step, a structure can be embossed into the top side which is at least partially synchronous with the decorative pattern; in technical terminology, this is known as "embossed in register".

DETAILED DESCRIPTION FO THE DRAWINGS

Figure 2:
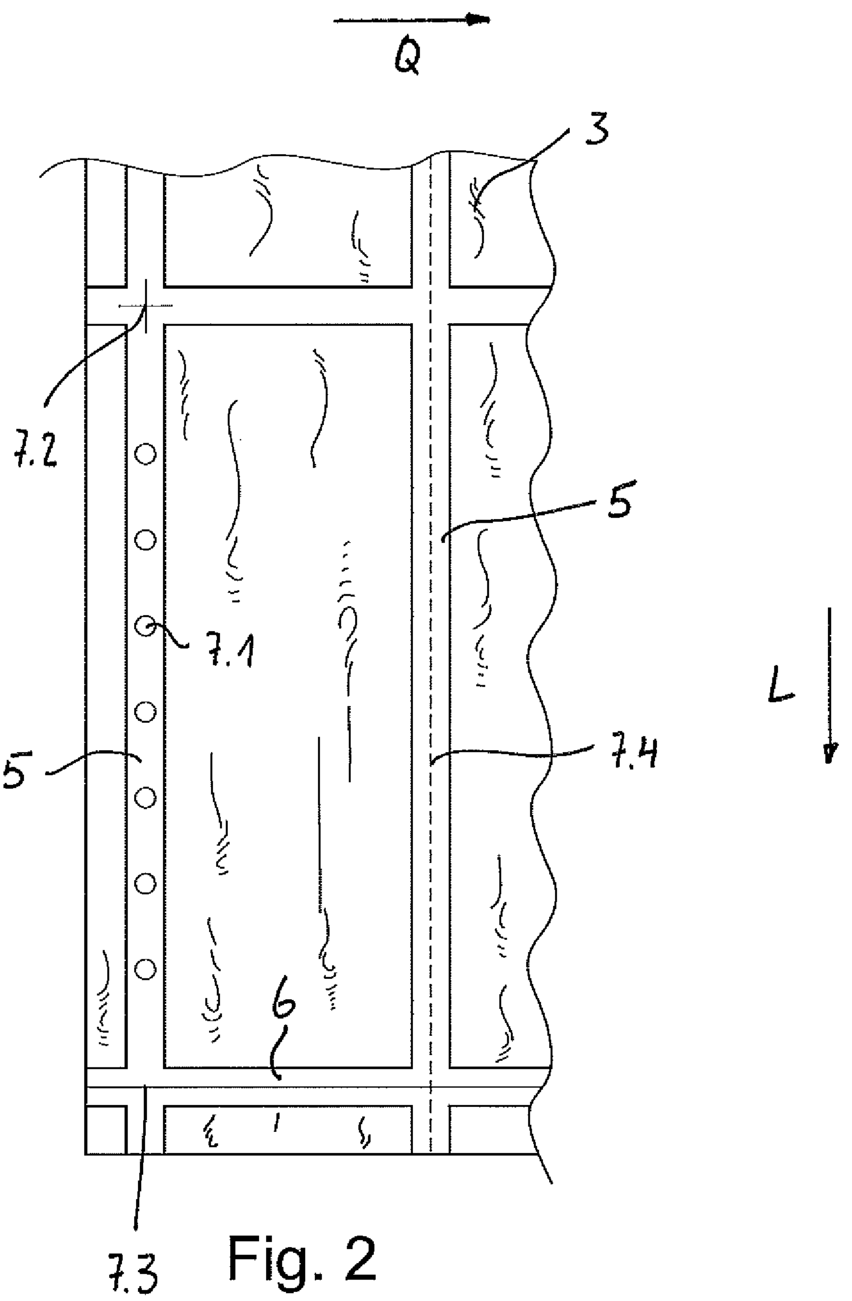
Figure 3:
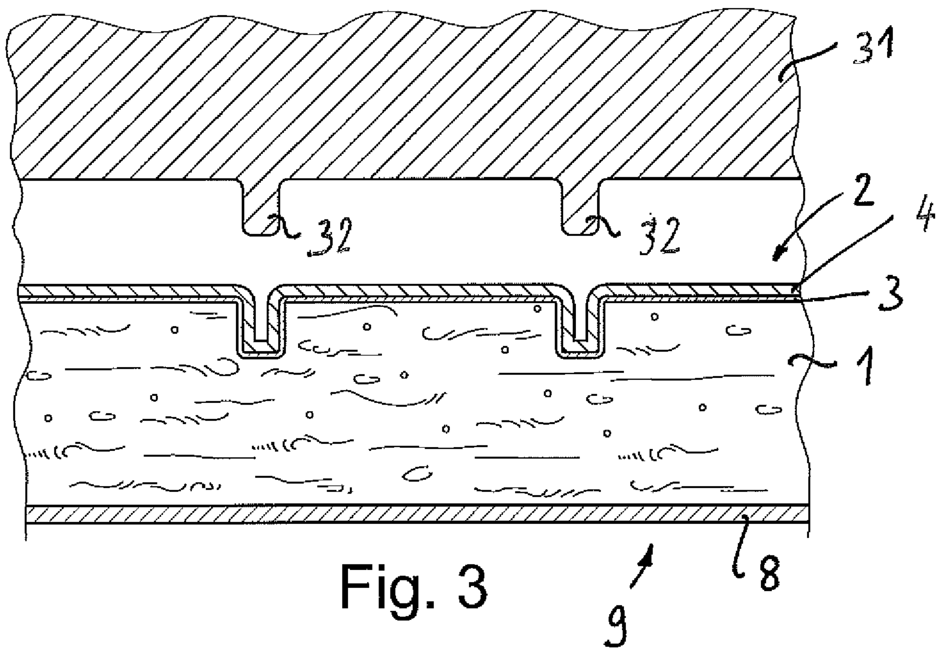
Figure 4:
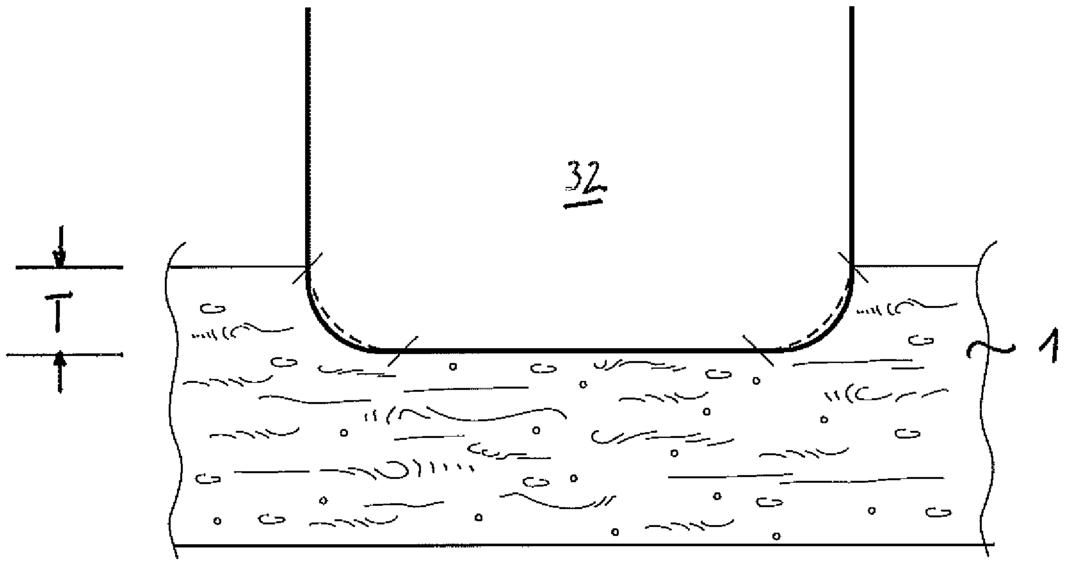
Figure 5:
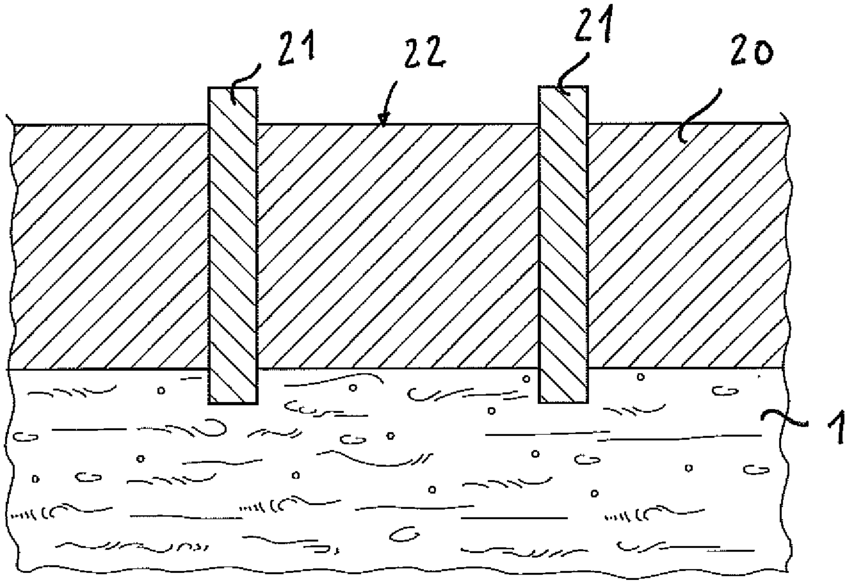
Figure 6:
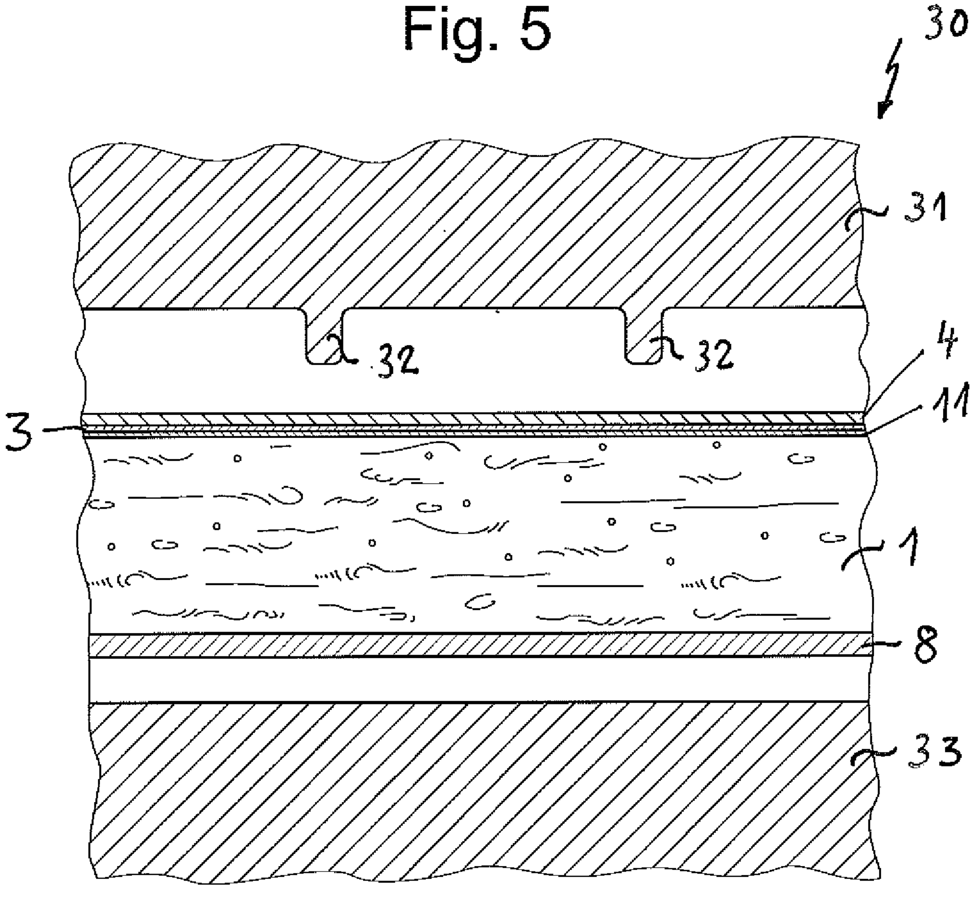
Figure 7:
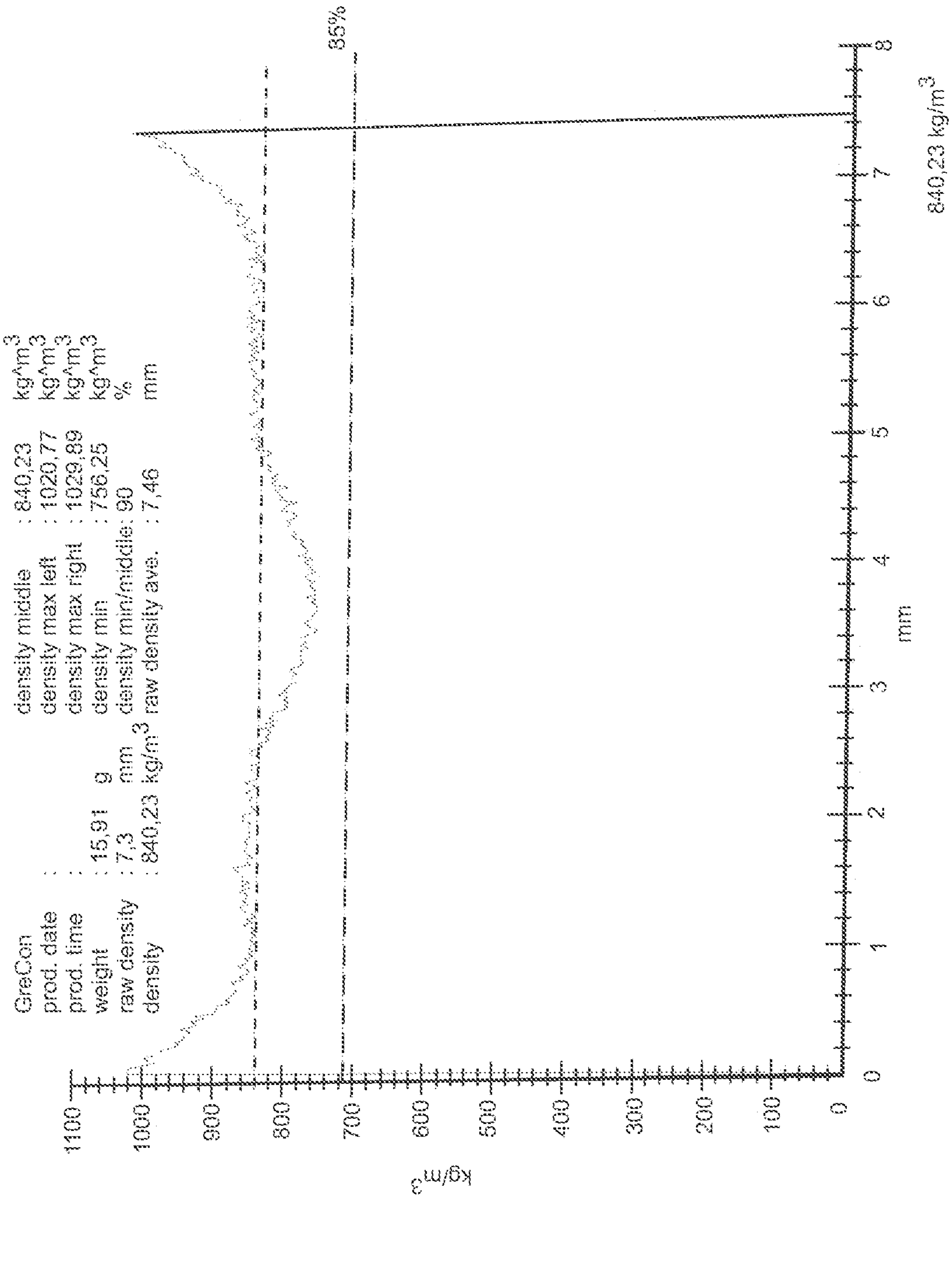
Figure 8:
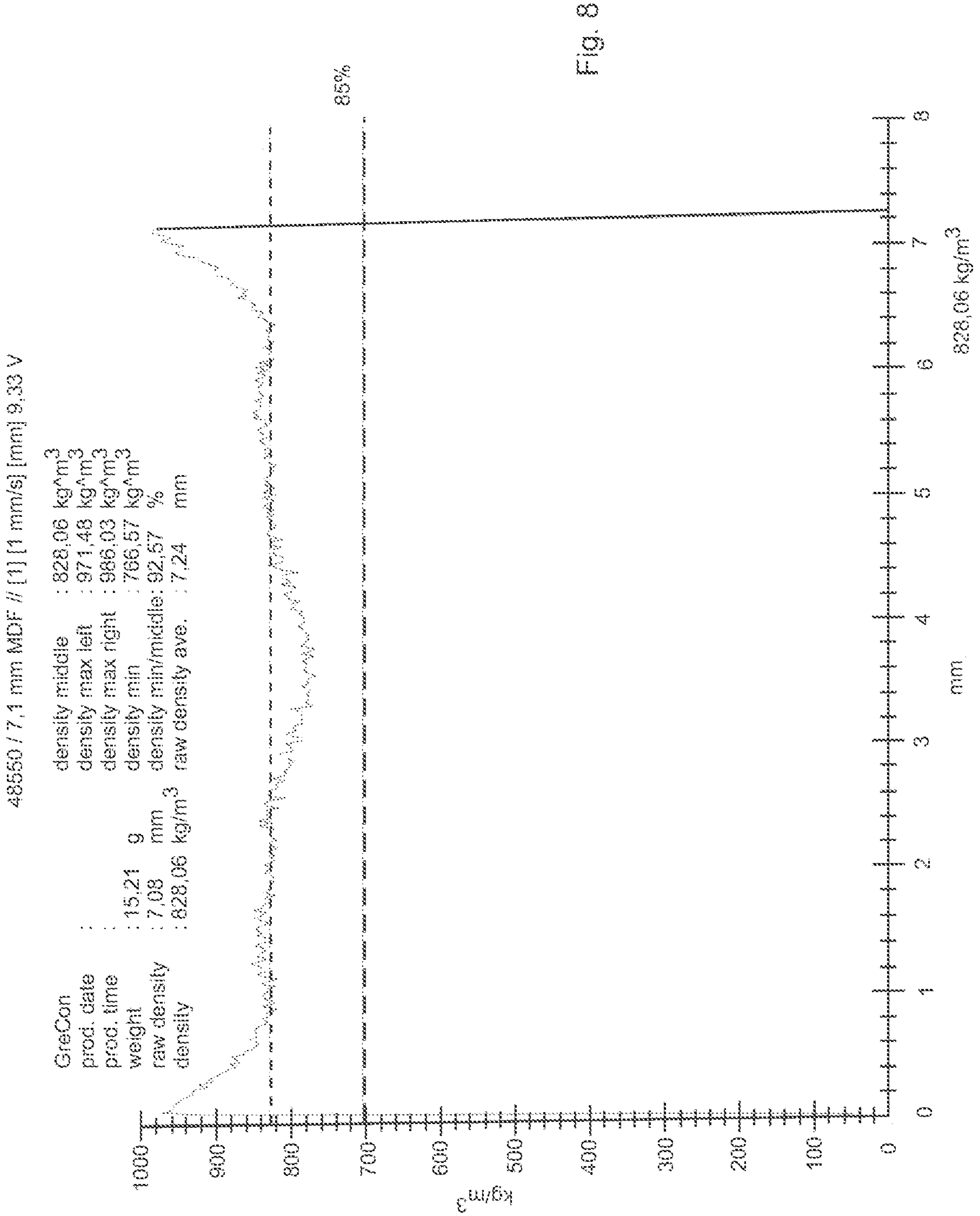
Figure 9:
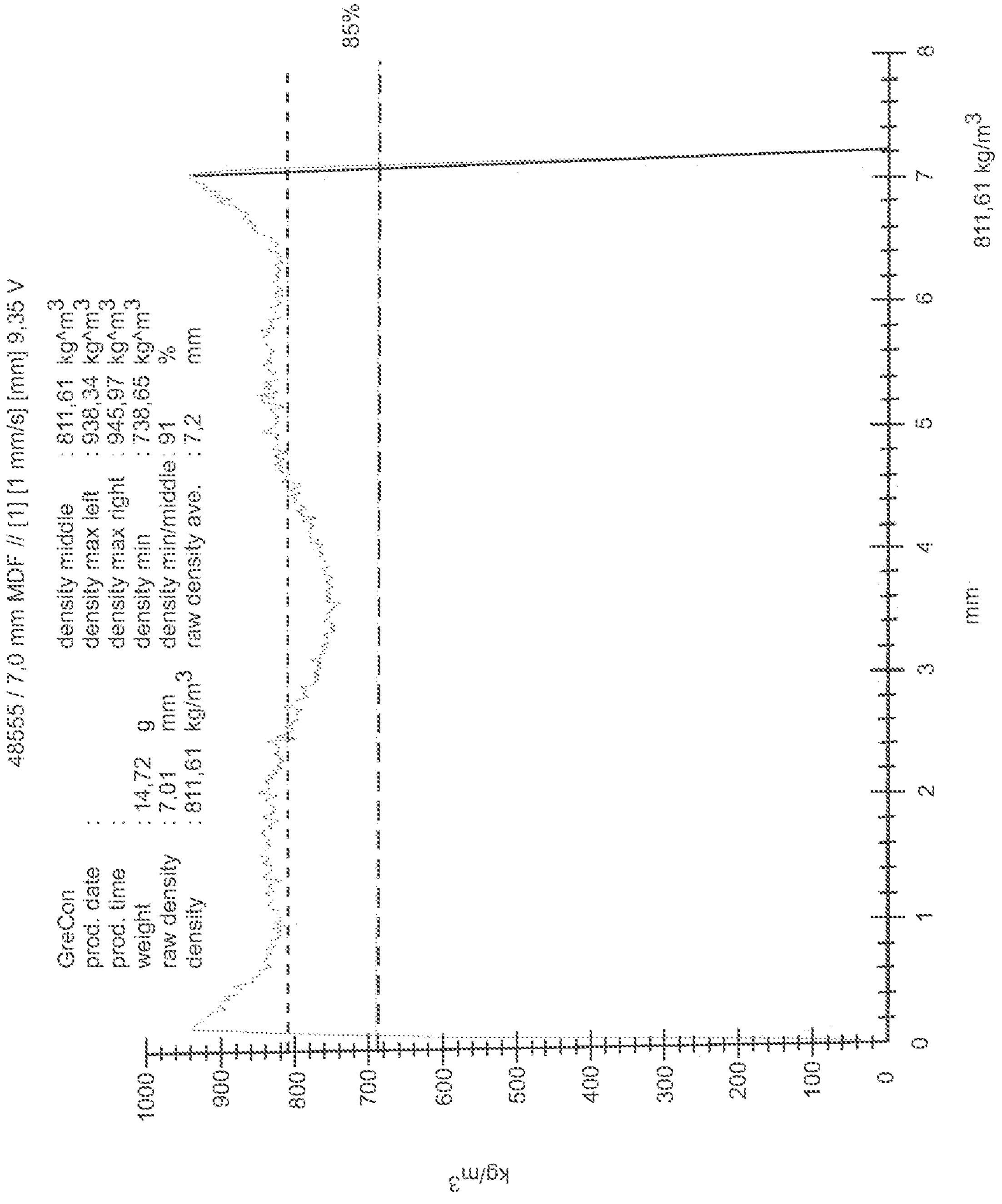

In the following, an example of an embodiment of the invention will be explained in more detail with the aid of a figure: They show:

FIG. 1—a perspective partial image of a large-size building panel;

FIG. 2—the top view of the building panel according to FIG. 1;

FIG. 3—a schematic partial image before the second embossing step;

FIG. 4—an enlarged partial image during the second embossing step;

FIG. 5—a schematic partial image during the first embossing step;

FIG. 6—a schematic image of the building panel in the short-cycle press;

FIG. 7—a typical bulk density profile of an HDF panel;

FIG. 8—the bulk density profile of a first large-size building panel;

FIG. 9—the bulk density profile of a second large-size building panel;

DETAILED DESCRIPTION

The starting point is a large-format HDF panel with a length of 2800 or 1860 mm, a width of 2070 mm and a thickness of 7 to 14 mm. The bulk density is lower than that of a conventional HDF panel, as a comparison of FIG. 7 with FIGS. 8 and 9 shows. In order to form a weak top layer that can be plastically deformed, the peaks of the top layer have been lowered by at least 40 kg/m$^3$ compared to the standard. Good results have been achieved with a lowering of up to 60 kg/m$^3$. The bulk density ranges from 950 to 1000 kg/m$^3$. An example of the bulk density profile of a conventional HDF panel is shown in FIG. 7. FIGS. 8 and 9 depict examples of bulk density profiles of building panels used according to the invention.

In order to emboss depressions 5, 6 into the upper side 2 of building panel 1, said panel is first heated to a temperature between 30 and 50° C. using steam. 10 to 50 g/m$^3$, preferably 30 g/m$^3$, aqueous melamine resin is then applied as a tempering agent. This can be a standard impregnating resin with a solid content of 50 to 65% by weight, preferably 60% by weight. Besides water, other additives such as curing agents, wetting agents and the like may be present in the solution. Alternatively, UF resin or, in mixtures, UF and melamine resin can be used as a bonding agent. It is either a postforming resin or a standard impregnating resin, which is rendered more elastic by adding flexibilizing agents (e.g. 1,4-butanediol, caprolactam, polyglycol etc.) A subsequent addition of the elasticizer should be in the range of about 3 to 7% by weight.

The building panel 1 pre-treated in this way is passed through one or more calender rolls 20 arranged one behind the other with embossing rings 21 arranged parallel to them. In a first embossing step, depressions 5, 6 with a depth T of up to 0.7 mm are embossed into the upper side 2 via the at least two embossing rings 21, wherein said depressions extend in longitudinal direction L and transverse direction Q. Here, the line pressure of the embossing rings 21 is up to 300 N/mm and the surface temperature is up to 220° C. In this first embossing step, the tempering agent on the upper side 2 is at least partially converted, i.e. it cures at least partially and thus increases the bulk density. The depressions 5, 6 can be formed in steps, for example by using several calender rolls 20 with different embossing rings 21 and initially embossing, for example, 0.3 mm and then a further depth T of up to 0.7 mm. A structure can be engraved into the casing 22 of calender roll 20 between the embossing rings 21, said structure then being embossed into the upper side 3 next to the depressions 5, 6 in the first embossing step.

After the first embossing step, the upper side 2 is primed with a white base color. After the base color has dried, a decorative pattern 3 is printed onto the primer 11 using digital printing, wherein the color dots of the digital printer are reproduced not only on the flat upper side 2, but also on the side walls 5.1, 5.2 and the bottom wall 5.3 of the strip-shaped depressions 5, 6, so that the depressions 5, 6 are completely decorated. The decorative pattern 3 can be single-colored or multicolored and is applied in such a way that it is at least partially synchronised with the structure that has just been embossed. At the same time as the decorative pattern 3, markings 7 are printed on the bottom wall 5.3. The markings 7 can be circles 7.1, crosses 7.2, lines 7.3 and dashes 7.4 or other geometrical figures. Via these markings 7, the building panel 2 can be aligned by a camera system for carrying out further processing steps.

After the printing of the decorative panel, a backing layer 8 is placed on the lower side 9 of the building panel 1 and an overlay paper 4 on the decorative pattern 3. Instead of an overlay paper 4, a liquid overlay, into which corundum is mixed or sprinkled, can also be applied by roller application. The backing layer 8 can also be applied in liquid form. This structure is then fed to a short-cycle press 30, whose upper press plate 31 features strip-shaped elevations 32. Using the markings 7 and a camera system, the building panel 1 is aligned so that the elevations 32 dip again into the embossed depressions 5, 6 during the subsequent pressing of the structure and the side walls 5.1, 5.2 of the depressions 5, 6, which are rounded during the coating of the upper side 2, are embossed again in order to adjust parallel and flat side walls 5.1, 5.2 in a second embossing step without changing the depth T of the depressions 5, 6 or the position of the bottom wall 5.3. As FIG. 4 shows, the elevations 32 in the transition area from the side walls 5.1, 5.2 to the bottom wall 5.3 are designed to be larger than the width of the depressions 5, 6, in order to safely form the lower edges of the depressions 5, 6.

The press time in the second embossing step is between 10 and 30 seconds, preferably 12 to 15 seconds, during which time the resins melt and bond to the building panel 1. The temperature of the press plates 31, 33 is increased during the pressing process, so that a surface temperature of 120° up to 180° C. increases on the pressed piece during the pressing process. The pressure curve changes from a pressure build-up phase to a holding phase and a pressure reduction phase. Here, the embossing depth T will occur in the manner of a path control. At least one calender roller 20 is integrated in the printing system or directly upstream of it. To achieve a sensible design, at least two depressions 5, 6 must be embossed in the first embossing step in the longitudinal direction L and at least two in the transverse direction Q, so that the side edges of the divided panels are all lowered.

The invention claimed is:

1. A method for finishing a supplied building panel made of a wood material, with an upper side and a lower side, comprising:

in a first embossing step, embossing a relief at least into the upper side as first strip-shaped depressions with two opposing side walls, a bottom wall connecting said side walls and a depth (T);

printing a decorative pattern on the embossed upper side of the building panel;

sealing the decorative pattern by applying an abrasion-resistant layer;

embossing additional depressions extending at an angle (α) transversely to the first strip-shaped depressions; once the structure is completed, the structure comprises at least the decorative pattern and the abrasion-resistant layer;

laminating the building panel in a short-cycle press under pressure and at a temperature;

in a second embossing step, embossing in the strip-shaped depressions to achieve formation of the side walls without changing a position of the bottom wall in terms of depth (T); and dividing the large-size supplied building panel into individual panels by carrying out a saw cut in and along each of the depressions.

2. The method according to claim 1, wherein the building panel is an HDF panel, and the upper side of which features a press skin.

3. The method according to claim 2, wherein the press skin has a thickness of 0.3 to 0.5 mm.

4. The method according claim 1, wherein a bulk density of the building panel in a top layer that forms the upper side is between 950 and 1.000 kg/m$^3$.

5. The method according to claim 1, further comprising applying a tempering agent to the upper side before or after the first embossing step.

6. The method according to claim 5, wherein the tempering agent is an aqueous melamine resin.

7. The method according to claim 1, wherein the building panel is heated to 40 to 80° C., before the first embossing step and a surface temperature of up to 220° C. is achieved when embossing the at least one depression comprising the first strip-shaped depressions.

8. The method according to claim 7, wherein the building panel is heated using steam.

9. The method according to claim 1, wherein the upper side is primed with a white paint before the embossing of the first strip-shaped depressions.

10. The method according to claim 1, wherein at depression of the first strip-shaped depressions is printed with a single-colored or multicolored decorative pattern using a digital printer.

11. The method according to claim 1, wherein the first embossing step is conducted by at least one calendar roller.

12. The method according to claim 1, wherein the depth (T) of the at least one depression of the additional depressions is up to 0.7 mm.

13. The method according to claim 1, wherein the additional depressions are designed in steps.

14. The method according to claim 1, further comprising printing markings on the bottom wall of the at least one depression of the additional depressions.

15. The method according to claim 12, wherein re-embossing in the depressions in the second embossing step is conducted by means of strip-shaped elevations on a press plate of the short-cycle press.

16. The method according to claim 1, wherein a structure is embossed into the upper side which is at least partially synchronous with the decorative pattern.

17. The method according to claim 7, wherein the building panel is heated to 60° C.

* * * * *